United States Patent [19]

Wise

[11] Patent Number: 5,007,670

[45] Date of Patent: Apr. 16, 1991

[54] REMOVABLE AND ADJUSTABLE FITTABLE VEHICLE BED LINER ASSEMBLY

[76] Inventor: Ronald D. Wise, 1305 Riverside Rd., Old Hickory, Tenn. 37138

[21] Appl. No.: 429,386

[22] Filed: Oct. 31, 1989

[51] Int. Cl.$^5$ .............................................. B62D 33/00
[52] U.S. Cl. .................................................. 296/39.1
[58] Field of Search ................... 296/39.1, 39.2, 39.3, 296/97.23; 428/95, 34, 161, 159

[56] References Cited

U.S. PATENT DOCUMENTS

| | | | |
|---|---|---|---|
| 2,909,234 | 10/1959 | Belk | 296/97.23 |
| 3,953,632 | 4/1976 | Robinson | 428/95 |
| 4,111,481 | 9/1978 | Nix et al. | 296/39.2 |
| 4,161,335 | 7/1979 | Nix et al. | 296/39.2 |
| 4,279,439 | 7/1981 | Cantieri | 296/39.2 |
| 4,288,490 | 9/1981 | Alfter et al. | 296/39.2 |
| 4,396,219 | 8/1983 | Cline | 296/39.2 |
| 4,789,574 | 12/1988 | Selvey | 296/39.2 |

FOREIGN PATENT DOCUMENTS 2006741 9/1971 Fed. Rep. of Germany.

*Primary Examiner*—Robert R. Song
*Attorney, Agent, or Firm*—Gifford, Groh, Sprinkle, Patmore and Anderson

[57] ABSTRACT

A liner assembly for lining the bed portion of a pickup truck, a van or the like is disclosed. The liner includes a pad portion having a series of parallel, spaced apart channels defined on its underside for mating with the series of parallel, spaced apart corrugations conventionally provided on the bed surface of the bed portion of the truck or van. The pad portion may be a single piece of a resiliently soft material such as an expanded plastic or a closed-cell polyethylene foam or may be a laminated, bi-layered pad portion comprising an upper layer of carpeting and a lower layer of resiliently soft material such as an expanded plastic or foam. The pad portion is removably fastenable to the bed surface by a plurality of selectively positionable hook and loop fastening assemblies. Preferably, the loop portion of the fastening assembly is fastenable to the bed surface, preferably by adhesion. The hook portion of the hook and loop fastening assembly is fastenable to the pad portion by a conventional fastener. The width and length of the liner assembly may be selectively adjusted by cutting along pre-defined perforations provided through the pad portion.

20 Claims, 2 Drawing Sheets

REMOVABLE AND ADJUSTABLE FITTABLE VEHICLE BED LINER ASSEMBLY

BACKGROUND OF THE INVENTION

I. Field of the Invention

The present invention relates generally to bed liner assemblies for lining the bed surface of the bed portion of pickup trucks, vans and the like. More particularly, the present invention relates to a bed liner assembly for bed surfaces where the assembly is removably attachable and may be conveniently adjusted for its overall dimensions of width and length by cutting along preselected perforations.

II. Description of the Relevant Art

The universal appeal of multi-functional vehicles such as pickup trucks is old and well established. Pickup trucks have been proven successes ever since their introduction at the beginning of the 20th century. In one of their earliest and most popular embodiments, the Ford Model "T" could be purchased as a pickup-style vehicle, with the pickup bed being interchangeable with the so-called "turtle deck".

The utility of such vehicles has always been popular on the farm, for example, and later, the pickup-style vehicle found a home in modern times also in the city. Pickup truck style vehicles are attractive mostly because they provide the user with a significant amount of cargo space, while at the same time providing a comfortable driving environment. As presently known, pickup style trucks reflect all of the well-known comforts of the more conventional passenger car.

Within the last twenty years, a similar growth in popularity of vehicles known as cargo vans has also occurred. The cargo van offers many of the advantages of the pickup truck, but has a further advantage in that the cargo area is enclosed and, therefore, not exposed to the elements.

Long gone are the times that the pickup truck or van have application only toward the movement of heavy materials such as lumber, block, old auto parts and the like. Present pickup trucks may be fitted with attractive and comfortable caps over the bed portion to thereby enclose the bed portion. In this way, both pickup trucks and vans may be used for more conventional vehicle living space, and very often it is found desirable to have such spaces fitted for sleeping and the like.

It naturally follows that owners of pickup trucks and vans have long sought convenient ways of covering up the bed surface of the bed portion to thereby provide both aesthetic attractiveness and warmth. To accomplish this, sections of carpet have been cut to fit into the bed portion and to thereby cover more or less the bed surface. A foam material has been likewise cut to fit into the vehicle bed.

However, this approach suffers from at least three inherent difficulties.

First, only the most careful and patient worker can provide the proper cutting of the pad or carpet and fitting of the pad or carpet to the bed surface. This difficulty arises from the fact that both carpeting and padding is somewhat difficult to cut and in most "do it yourself" approaches, the borders and edges typically are uneven and are incapable of being properly fitted to the surfaces applied.

Second, there is no convenient or practical method by which the pad may be removably attached to the bed surface. Typically, the pickup truck or van owner does not necessarily want to limit the use of the bed surface to only human application. In other words, the pickup truck or van owner may prefer to remove the bed pad when the vehicle is used for heavy or dirty work, and to replace the pad when the vehicle is used for a purely human environment. To simply lay the pad in, for example, the bed portion of a pickup truck without having a means of attaching the pad to the bed surface would result in the pad being able to fly out of the bed portion when the vehicle is at highway speed. Similarly, a pad which is incapable of being fixed to the bed surface results in undesirable shifting or movement of the pad whether the pad is used in the bed portion of a pickup truck or the van.

Third, the conventional approach to supplying pad segments into the bed portion of a vehicle results in an uneven surface, as the bed surface of the bed portion itself is conventionally uneven, being provided with a series of spaced apart parallel corrugations which considerably improve the structural integrity of the bed portion. When the user fits a pad onto this uneven terrain, the resulting pad surface is also similarily uneven. When a carpet is applied in addition to or in lieu thereof, the same result is known.

Accordingly, present approaches to providing bed pads and the like to the bed surface of the bed portion of a pickup truck or a van have failed to provide a fully practical and even pad while similarly failing to provide a pad which fits properly.

SUMMARY OF THE PRESENT INVENTION

The present invention provides a pad assembly for placement in the bed portion of a pickup truck or a van which overcomes the known problems of present approaches to providing pad assemblies.

The liner assembly for lining the bed portion of a pickup truck, a van or the like includes a pad portion having a series of parallel, spaced apart channels defined on its underside for properly mating and fitting with the existing series of parallel, spaced apart corrugations conventionally provided on the bed surface of the bed portion of the truck or van.

The pad portion may be a single piece of resiliently soft material such as an expanded plastic or a closed-cell polyethylene foam or may be a laminated, bi-layered pad portion comprising an upper layer of carpeting and a lower layer of resiliently soft material such as an expanded plastic or foam. When provided in its bi-layer composition, the carpet portion is adhesively applied to the lower layer. Adhesion may be accomplished by flame bonding or a glue adhesive.

The carpet layer may be provided in a variety of colors whereby the carpeting is matchable with the color of the vehicle.

In either the single layer or double layer construction, the upper surface may be a heavy vinyl with a grain or similar texture embossed thereupon.

The pad portion is removably fastenable to the bed surface by a plurality of selectively positionable hook and loop fastening assemblies. Because the liner assembly of the present invention is directed at being applicable to a variety of bed surfaces, the hook and loop fastening assemblies are provided with the pad portion as a kit, whereby once the pad portion is cut to fit the bed surface of the vehicle as will be disclosed below, the proper places for strategically achieving the preferred attachment points between the bed surface and the underside of the pad portion may thereafter be fixed.

Accordingly, preferably the loop fastening portion is provided with an adhesive to its back side. The complementary hook fastening portion includes a sturdy back. Once the proper place for affixing the hook and loop fastening assemblies is located, a machine screw fitted through the back of the hook portion is inserted through a hole defined in the pad portion. The hole is selectively defined by the person fitting the liner assembly to the bed surface of the vehicle.

Once inserted in the hole, the machine screw is locked thereto by a flat washer and a nut. The individual fitting the liner assembly to the bed surface then locates the point on the bed surface at which the fastener fitted to the bed portion will overlie, and, removing the adhesive protector, fastens the complementary fastener to the bed surface. This is selectively done at strategic points on the bed surface and the pad portion.

By this assembly, the bed portion may be selectively removed and reattached to the bed surface of the vehicle as desired by the user.

To fit the tab portion to the dimensions of the bed portion, the pad portion includes therewith a plurality of selectively placed perforations. These perforations are defined through the entire thickness of the pad portion. The perforations may number as many or as few perforations as are required to allow the user to cut the pad portion to size. Cutting may be achieved by use of a sharp knife, scissors or a razor. The perforations may define only corners and only a few widely spaced slots to be intercut by the user, or may be a series of closely situated perforations which are aligned to easily allow the fitter to go from one perforation to the next, thereby completely a large cutting.

In addition to providing perforations as described above which are directed at adjusting the length or width of the pad portion so as to fit a variety of bed surfaces, the perforations may also be selectively applied to provide possible apertures which may be selectively opened thereby allowing the fitting therethrough of table and chair legs.

When the perforations are used either for providing adjustment for the length or width of the bed portion or when they are used for allowing the fitter to more accurately define apertures for legs and the like, the perforations provide the resulting bed portion with a very neat and finished appearance, in addition to allowing improved accuracy.

By effectively smoothing out the corrugations of the bed, the present invention provides cushioning and protection to both passengers and cargo, thus offering a significant improvement over the prior art "bed liners" which were only (or primarily) directed at protecting the painted surface of the bed. Of course, the present invention also protects painted finishes.

Furthermore, the present invention overcomes the problems of known methods for applying pads to the bed surfaces of vans, pickup trucks and the like. It should be understood, however, that the present invention also may be applied to other uses beyond those related to trucks and vans, and may accordingly be directed at providing a pad surface for buses, campers, motor homes, house trailers, and the like. In addition, the system may also be directed at use in recreational boats, whether they are power or sail boats.

Other advantages and features of the present invention will become more apparent from the following detailed description when read in conjunction with the accompanying drawing.

BRIEF DESCRIPTION OF THE DRAWING

The present invention will be more fully understood by reference to the following detailed description of the preferred embodiment of the present invention when read in conjunction with the accompanying drawing, in which like reference characters refer to like parts throughout the views, and in which.

DETAILED DESCRIPTION OF THE PREFERRED EMBODIMENT OF THE PRESENT INVENTION

Figure 1:
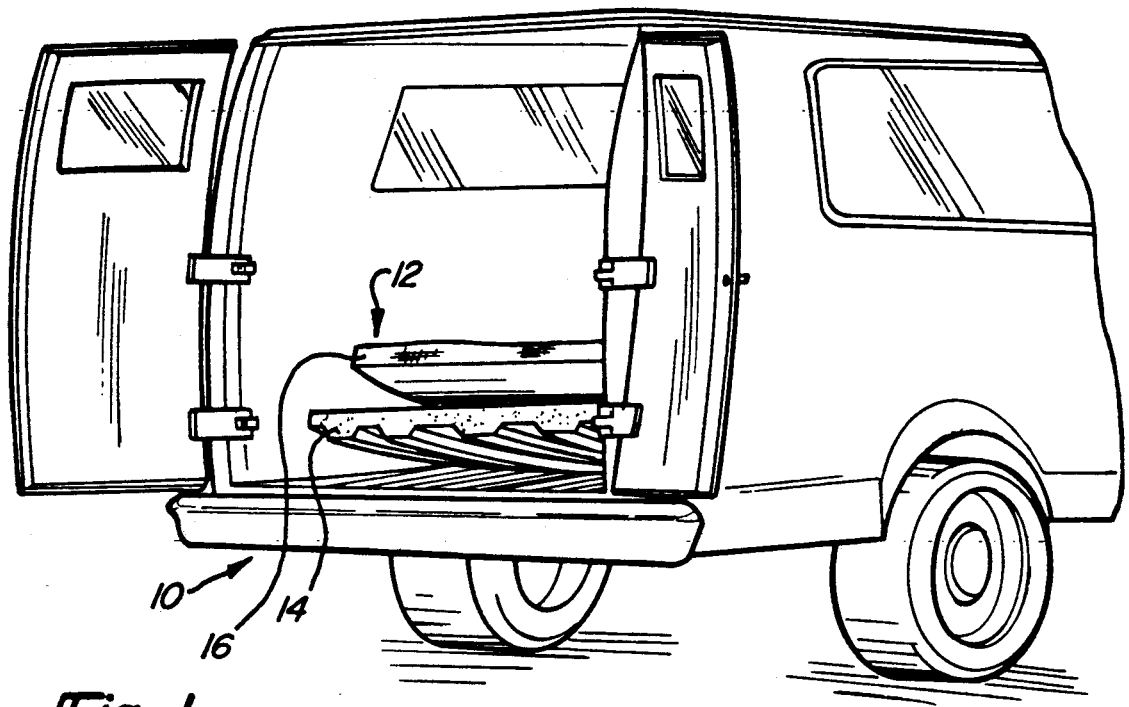
FIG. 1 is an elevational, perspective view showing the liner assembly of the present invention in its layered form in place within the bed portion of a van.

The drawing discloses the preferred embodiment of the present invention. While the configuration according to the illustrated embodiment is preferred, it is envisioned that alternate configurations of the present invention may be adopted without deviating from the invention as portrayed. The preferred embodiment is discussed hereafter.

Referring to FIG. 1 a van is disclosed, generally indicated as 10 having fitted therein the liner assembly according to the present invention. Of course, the van 10 may also represent a pickup truck or a similar vehicle. Accordingly, the van 10 is used here for illustrative purposes only.

The liner assembly of the present invention is disposed substantially within the van 10, and is generally indicated as 12. The liner assembly includes a lower layer 14 and an upper layer 16. The lower layer 14 is preferably composed of a soft material such as a resiliently soft expanded plastic or foam. The upper layer 16 comprises a carpeting, although the layer 16 is optionally provided. Although the illustration of FIG. 1 discloses the lower layer 14 being separated from the upper layer 16, these two layers are preferably, when provided in their pair, adhered together by means of a conventional adhesive. In this way, the liner assembly 12 may be sold as single piece, rather than having the fitter concern himself with associating the upper layer and the lower layer.

Figure 2:
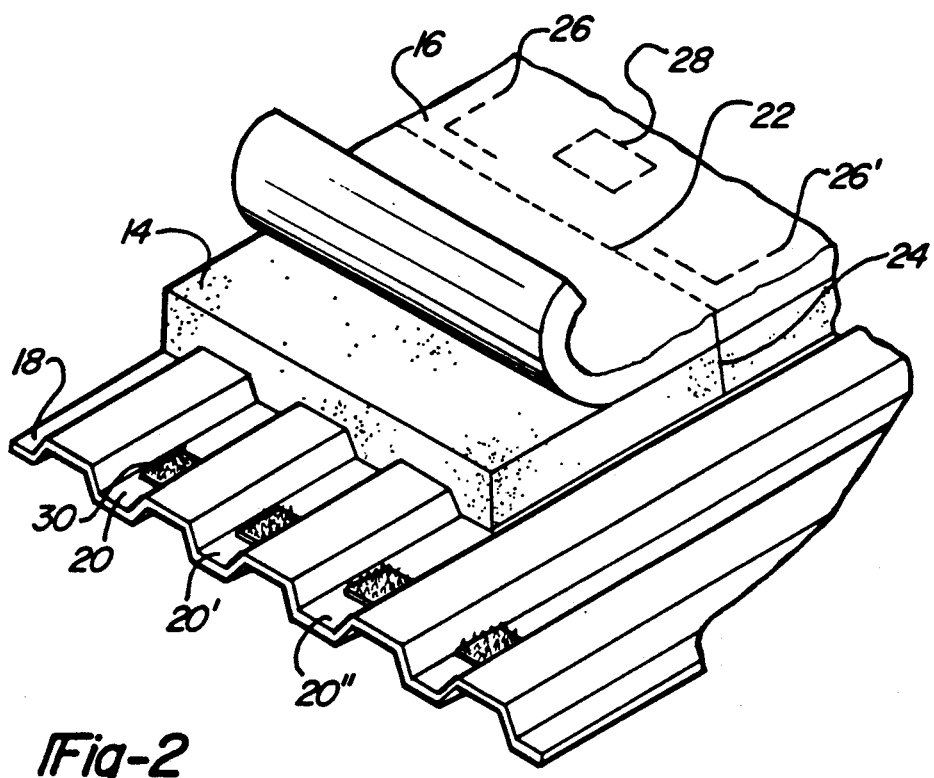
FIG. 2 is a perspective view showing, in section, a segment of bed surface of a foam portion placed thereover, with the foam portion being partially covered by a carpet portion.

Referring to FIG. 2, a perspective view of a segment of a bed surface 18 is illustrated, and has disposed thereover the lower layer 14 and the upper layer 16 of the pad assembly 12. This illustration more clearly discloses the construction of the adjoining layers 14 and 16. It should be noted, however, that there are known polymers which may be provided as one piece and which have a lower portion which is resiliently soft as a foam, and an upper portion which may substantially represent a carpeted-type surface. Of course, such materials may be used in place of the present bi-layered construction.

As illustrated, the bed surface is substantially corrugated. This corrugation defines a series of parallel and spaced apart channels generally illustrated as 20, 20', 20". As may be clearly seen, the lower layer 14 has defined in its lower side complementary channels which provide a cooperative fit between the lower layer 14 and the bed surface 18.

This figure well illustrates two of the important advantages of the present invention. One advantage is represented by a series of perforations 22. The perforations 22 are defined fully through the thickness of the liner assembly 12 as may be illustrated by the perforation 24. These perforations may be aligned as shown thereby providing the fitter with a preselected length against which to work, or may-be provided in a substantially spaced apart relationship as shown between a pair of sets of perforations 26, 26'. In this manner, when the perforations 26, 26' are provided, the fitter may be draw a knife between the perforations instead of relying on the series of perforations shown as 22. When drawing the line between the base perforations 26, 26', the fitter may cut therebetween using a straight edge as a guide.

In addition to providing substantially aligned perforations, other perforations may be provided, such as that shown as a box perforation 28. The box perforation 28 allows the user to fit legs of chairs or tables and the like through the pad portion. In this manner, the liner assembly may be fitted not only to a variety of differently-dimensioned bed surfaces, but may also include perforations which define apertures whereby the legs of furnishings may be situated.

The present figure also discloses a part of the attachment assembly for removably attaching the liner assembly 12 to the bed surface 18. As illustrated, one fastener portion 30 is shown. Preferably, because the loop fastener requires construction from a soft, flexible material, the fastener 30 is the loop fastener. Thus fitted, the loop fastener 30 is provided with a resilient backing in the bed surface 18.

Figure 3:
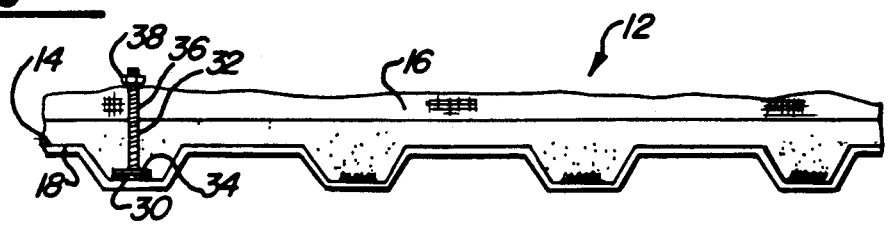
FIG. 3 is a sectioned side view showing the interrelationship of the bed surface, the pad portion, and the carpet portion.

Referring now to FIG. 3, a cross-sectional view of a liner assembly 12 is fitted over and cooperates with the bed surface 18. This figure well illustrates how the lower layer 14 snugly cooperates with the surface terrain of the bed surface 18.

FIG. 3 also illustrates how the fastener assemblies may be selectively provided. Once the liner assembly is cut to its preferred dimensions along selected perforations, the liner assembly is laid over the bed surface. Thereafter, the fitter locates the preferable points of interconnection which would offer the most sound and strategic interattachment. For example, the fitter would naturally prefer to provide attachment assemblies at each of the corners of the liner assembly.

Accordingly, once the fitter has identified the proper and preferred places at which to attach the assemblies, a nail, ice pick or an awl is used to punch holes in the liner assembly where a hook fastener 32 is to be inserted. The hook fastener 32 comprises a hook fastener base 34. Because the hook fastener base 34 may be composed of a hard plastic or a nylon, this portion may be molded and provided with a hard backing. The hook fastener base 34 is attached to a machine screw 36. Once the machine screw 36 is fitted through the hole created by the nail, ice pick, or awl, the upper end of the machine screw is interfitted with a nut 38. Thus assembled, the loop fastener 30 may be adhered to the bed surface 18 at a point substantially under the hook fastener base 34.

Figure 4:
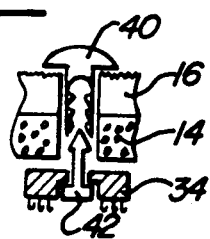
FIG. 4 is a sectional view of an alternate hook fastener assembly.

Referring to FIG. 4, an alternate assembly for attaching the hook fastener base 34 to the underside of the lower layer 14 is illustrated. The fastener assembly of the present embodiment comprises a combination of an upper female base member 40 and a lower male member 42. When the members 40, 42 are snapped together, the base 34 is securely held in place. This assembly defines a "Christmas tree stud" or a "ratchet fastener" as it is more commonly called.

Figure 5:
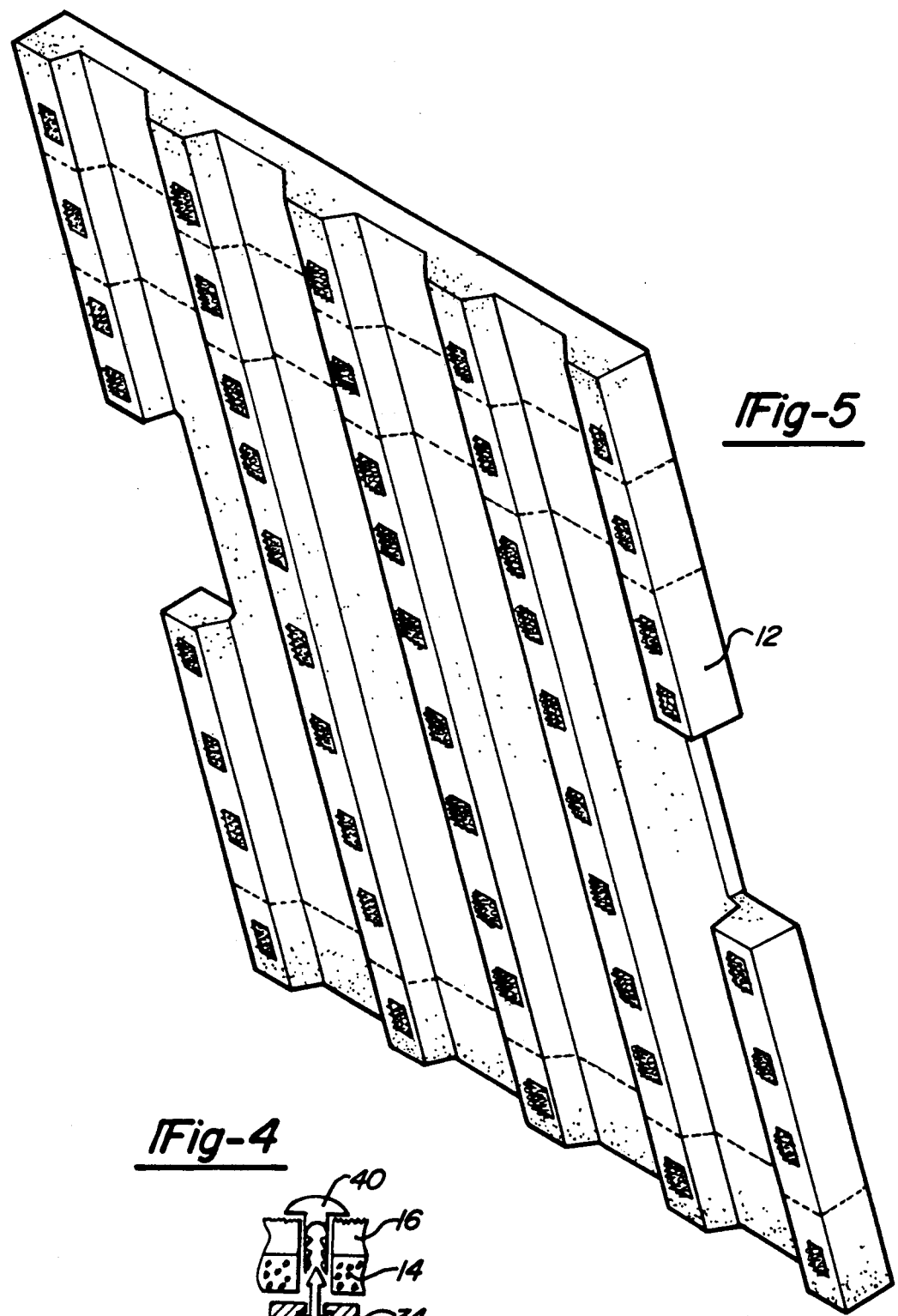
FIG. 5 is a perspective view illustrating the underside configuration of the pad portion.

Referring to FIG. 5, an underside view of a liner assembly 12 is illustrated, and shows the hook fasteners 34 before in place. Thusly, the liner assembly 12 may be firmly but removably attached to a bed surface of a truck, van and the like.

Having described my invention, however, many modifications thereto will become apparent to those skilled in the art to which it pertains without deviation from the spirit of the invention as defined by the scope of the appended claims.

I claim:

1. A liner assembly for lining the bed portion of a pickup truck, a van and the like, said assembly comprising:
   a liner having multiple layers;
   one of said multiple layers is a base layer;
   said base layer having a top side and a bottom side;
   said base layer further having a width and a length;
   another of said multiple layers is a resiliently yieldable layer fixed to said top side of said base layer;
   said resiliently yieldable layer having a width and a length equivalent to that of said base layer;
   said resiliently yieldable layer further having a top side and a bottom side;
   means for adjusting said length and said width of said base layer and said resiliently yieldable layer; and
   a plurality of pairs of detachably interattachable portions, comprised of a hooked portion attached to said bottom side of said base layer and a looped portion attached to said bed portion.

2. The liner assembly of claim 1 wherein said means for adjusting comprises preselected, substantially aligned perforations.

3. The liner assembly of claim 2 further including a plurality of preselected perforations defining removable segments.

4. The liner assembly of claim 3 wherein said resiliently yieldable layer comprises a carpet.

5. The liner assembly of claim 3 wherein said resiliently yieldable layer is a textured vinyl.

6. A liner assembly for lining the bed portion of a pickup truck, a van and the like, said assembly comprising:
   a plurality of layers;
   one of said plurality of layers is a base layer;
   said base layer having a top side and a bottom side;
   said base layer further having a width and a length;
   another of said plurality of layers is a carpet layer fixed to said top side of said base layer;
   said carpet layer having a width and a length equivalent to that of said base layer;
   said carpet layer further having a top side and a bottom side; and
   means for removably attaching said base layer to said bed portion comprising hook fasteners on said bottom side of base layer and loop fasteners on said bed portion.

7. The liner assembly of claim 6 wherein said liner assembly further comprises means for adjusting the width of said base portion and said carpet portion.

8. The liner assembly of claim 7 wherein said means for adjusting said width of said base portion and said carpet portion comprises preselected perforations defined along said width.

9. The liner assembly of claim 6 wherein said liner assembly further comprises means for adjusting the length of said base portion and said carpet portion.

10. The liner assembly of claim 6 wherein said base portion is composed of an expanded plastic.

11. A truck liner assembly for lining the bed portion of a pick-up truck, a van and the like, said assembly comprising:
 a base portion;
 said base portion having a top side and a bottom side;
 said base portion further having a width and a length;
 a carpet portion fixed to said top side of said base portion;
 said carpet portion having a width and a length equivalent to that of said base portion;
 said carpet portion further having a top side and a bottom side;
 means for removably attaching said base portion to said bed portion;
 said means for attaching said base portion to said bed portion comprises a plurality of pairs of detachably interattachable portions, one portion of each of said pairs being attached to said bottom side of said base portion and the other of each of said pairs being attached to said bed portion;
 a fastener for attaching said one portion of each of said pairs to said bottom side of said base portion; and
 said fastener comprises a nut and bolt, said bolt being situated to said base portion and said carpet portion, said nut being fastened to said bolt onto the top side of said carpet portion.

12. The liner assembly of claim 6 wherein said bottom side of said base portion has defined therein channels along said length, said channels being defined in a spaced apart, side by side relationship.

13. A liner assembly for the bed portion of a pickup truck, a van and the like, said assembly comprising:
 a liner pad portion having a plurality of layers placeable over said bed portion;
 said liner pad portion having a width and a length;
 means for adjusting said width and said length of said liner pad portion; and
 means for releasably attaching said liner pad portion to said bed portion comprising a hooked portion attached to said liner pad portion and a looped portion attached to said bed portion.

14. The liner assembly of claim 13 wherein said means for adjusting comprises a plurality of substantially aligned perforations.

15. The liner assembly of claim 14 further comprising at least one removable segment defined by a plurality of perforations.

16. A liner assembly for the bed portion of a pick-up truck, a van and the like, said assembly comprising:
 a liner pad portion placeable over said bed portion;
 said liner pad portion having a width and a length;
 means for adjusting said width and said length of said liner pad portion;
 means for releasably attaching said liner pad portion to said bed portion;
 said means for adjusting comprises a plurality of substantially aligned perforations;
 at least one removable segment defined by a plurality of perforations; and said at least one removable segment comprises a plurality of removable segments for accommodating the legs of seats through said pad portion.

17. A liner assembly for the bed portion of a pick-up truck, a van and the like, said assembly comprising:
 a liner pad portion placeable over said bed portion;
 said liner pad portion having a width and a length;
 means for adjusting said width and said length of said liner pad portion;
 means for releasably attaching said liner pad portion to said bed portion;
 said means for adjusting comprises a plurality of substantially aligned perforations;
 at least one removable segment defined by a plurality of perforations; and said at least one removable segment comprises a plurality of removable segments for accommodating the legs of at least one table through said pad portion.

18. A liner assembly for the bed portion of a pick-up truck, a van and the like, said assembly comprising:
 a liner pad portion placeable over said bed portion;
 said liner pad portion having a width and a length;
 means for adjusting said width and said length of said liner pad portion;
 means for releasably attaching said liner pad portion to said bed portion;
 said means for adjusting comprises a plurality of substantially aligned perforations;
 at least one removable segment defined by a plurality of perforations;
 said at least one removable segment comprising a plurality of removable segments for accommodating the legs of at least one table through said pad portion; and said means for releasably attaching comprises a plurality of pairs of hook and loop fasteners.

19. A liner assembly for lining the bed portion of a pickup truck, a van and the like, said assembly comprising:
 at least a base layer having a top side and a bottom side and having a width and a length;
 a carpet layer fixed to said top side of said base layer and having a width and a length equivalent to that of said base layer, said carpet layer further having a top side and a bottom side; and
 a plurality of pairs of detachably interattachable portions comprised of a hooked portion attached to said bottom side of said base layer and a looped portion attached to said bed portion.

20. The liner assembly of claim 19 wherein said base portion has a bottom side, said bottom side having defined therein along said length a plurality parallel, spaced apart channels.

* * * * *